US006903772B1

(12) United States Patent
Shinohara

(10) Patent No.: US 6,903,772 B1
(45) Date of Patent: Jun. 7, 2005

(54) IMAGE SENSOR

(75) Inventor: Mahito Shinohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/264,720

(22) Filed: Mar. 9, 1999

(30) Foreign Application Priority Data

Mar. 12, 1998 (JP) .......................................... 10-061229

(51) Int. Cl.⁷ ............................................... H04N 3/14
(52) U.S. Cl. ........................................ 348/311; 348/302
(58) Field of Search ................................ 348/296–299, 348/302, 229.1, 364, 362

(56) References Cited

U.S. PATENT DOCUMENTS

| 4,706,123 A | * | 11/1987 | Chautemps | ................. 348/297 |
| 5,182,658 A | * | 1/1993 | Ishizaki et al. | ............. 358/483 |
| RE34,309 E | | 7/1993 | Tanaka et al. | ......... 358/213.31 |
| 5,288,988 A | | 2/1994 | Hashimoto et al. | ...... 250/208.1 |
| 5,424,529 A | | 6/1995 | Hashimoto et al. | ...... 250/208.1 |
| 5,442,465 A | * | 8/1995 | Compton | .................... 358/782 |
| 5,587,738 A | | 12/1996 | Shinohara | ................... 348/302 |
| 5,627,620 A | * | 5/1997 | Iwasaki | ...................... 396/233 |
| 5,698,844 A | | 12/1997 | Shinohara et al. | ...... 250/214 R |
| 6,509,927 B1 | | 1/2003 | Prater et al. | ............. 348/222.1 |

FOREIGN PATENT DOCUMENTS

| EP | 0 626 784 A1 | 11/1994 | | |
| EP | 06276784 | 11/1994 | ............ | H04N/3/15 |
| JP | 8-237550 | 9/1996 | | |

OTHER PUBLICATIONS

R. Forchheimer, et al., "Single–Chip Image Sensors With a Digital Processor Array", Journal of VLSI Signal Processing, vol. 5, Nos. 2/3, Apr. 1993, pp. 121–131, XP000383060.
B. Ackland, et al., "Camera On A Chip", IEEE International Solid State Circuits Conference, vol. 39, Feb. 1996, pp. 22–25, XP 000685524.
R. H. Nixon, et al., "256 X 256 CMOS Active Pixel Sensor Camera–on–a–Chip", IEEE Journal Of Solid–State Circuits, vol. 31, No. 12, Dec. 1996, pp. 2046–2050, XP 000691827.
Office Action (in English) from counterpart application 99105839.9 from Patent Office in China, dated Nov. 21, 2003.
Robert Forchheimer, Single–Chip Image Sensors With a Digital Processor Array, Journal of VLSI Signal Processing, 5, 121–131 (1993).
European Communication pursuant to Article 96(2) EPC in Application No. 99 301 833.2–1241 (Jan. 13, 2004).

* cited by examiner

*Primary Examiner*—Tuan Ho
(74) *Attorney, Agent, or Firm*—Fitzpatrick, Cella, Harper & Scinto

(57) ABSTRACT

In order to downsize an image sensor, the present invention provides the image sensor which comprises: a plurality of photoelectric conversion elements; and a memory for storing therein control information used to control signals sent from the plurality of photoelectric conversion elements, and wherein the plurality of photoelectric conversion elements and the memory are formed in an identical semiconductor chip.

7 Claims, 4 Drawing Sheets

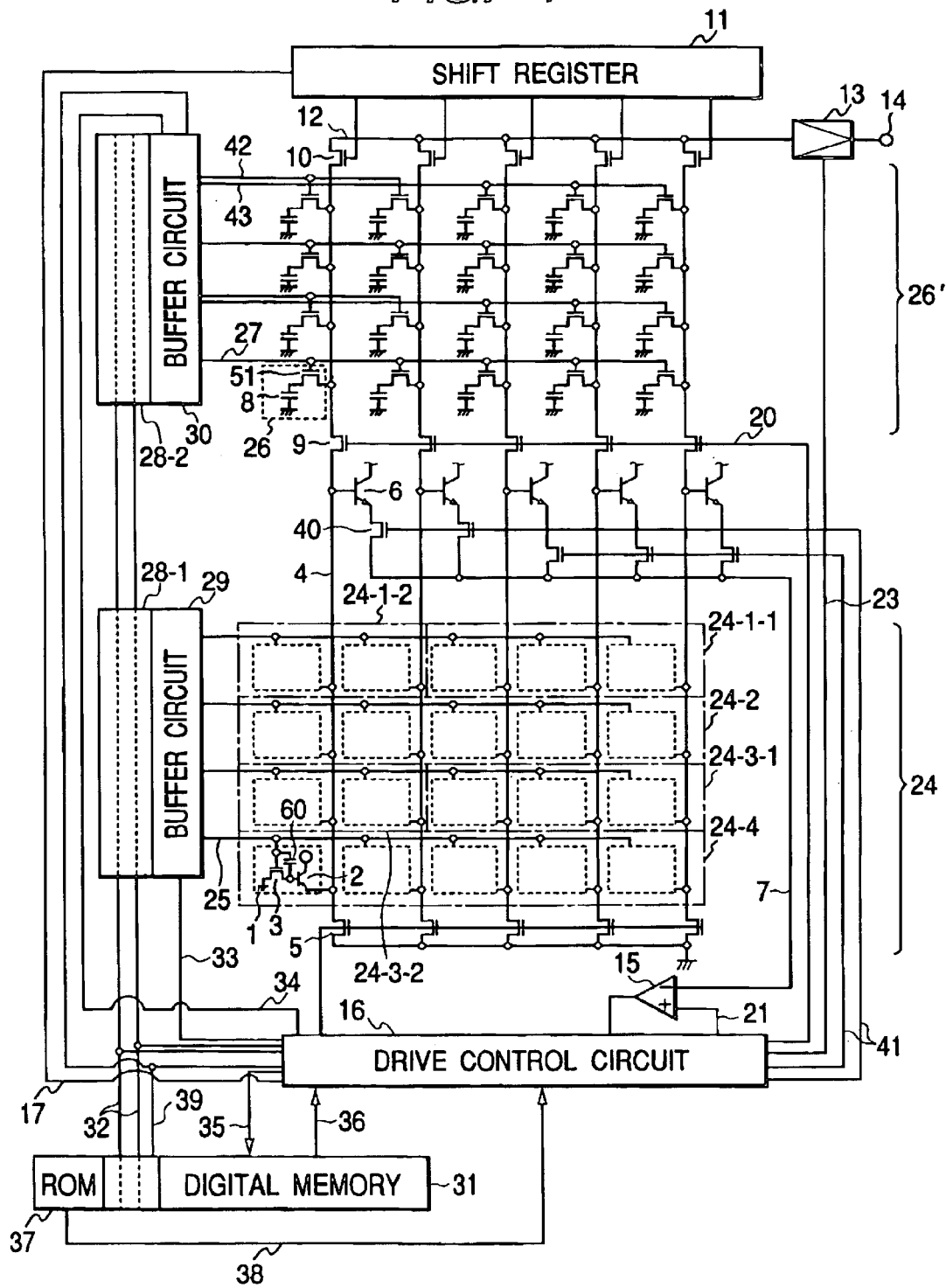

IMAGE SENSOR

BACKGROUND OF THE INVENTION

1. Field of the Invention

The present invention relates to an image sensor which has a memory together with photoelectric conversion elements within an identical semiconductor chip.

2. Related Background Art

Generally, as photoelectric conversion systems, there have been various systems in which images are read respectively by image sensors of CCD (charge coupled device) type, MOS (metal-oxide semiconductor) type, bipolar type and the like. For a video camera and the like, a CCD sensor of which image quality is excellent has been frequently used. On the other hand, even in the sensors of latter two types in recent years, SN ratio is improved, low power consumption is realized, and the sensor itself can be fabricated together with its peripheral circuits within one chip thereby realizing downsizing. For these reasons, such the advantages have brought the sensors of these two types into public notice.

Furthermore, it has been proposed in recent years an example that photoelectric conversion elements are assembled into photoelectric conversion blocks whose driving and output conditions can be determined independently. An example of one of the plurality of photoelectric conversion blocks arranged in the image sensor will be explained with reference to FIG. 1. FIG. 1 shows a one-dimensional image sensor. In the drawing, numeral 1 denotes a photoelectric conversion pixel composed of a bipolar transistor 2 and a MOS transistor 3 for resetting the base of the transistor 2. In the pixel 1, a PN junction formed in the base-collection junction region of the transistor 2 is irradiated, and a signal voltage generated by accumulation of electric charges owing to the incident light and the corresponding increase of base potential is output from the emitter of the transistor 2. As shown in FIG. 1, the plurality of pixels 1 are arranged over one line.

Numeral 50 denotes a voltage supply source for resetting the base of the pixel 1, numeral 4 denotes a pixel output line connected to the emitter of the transistor 2, numeral 5 denotes a MOS transistor for resetting the line 4, and numeral 6 denotes a bipolar transistor the base of which is connected to the line 4. The emitter of each transistor 6 in each line is connected to an output line 7 in common. The transistor 6 acts as a means for detecting the maximum value of the photoelectric conversion output, whereby the voltage corresponding to the maximum output voltage of the pixel array is generated from the output line 7.

As above, by connecting the emitters of the bipolar transistors to the output line in common, a maximum voltage detection circuit is formed.

Numeral 8 denotes a storage capacitor for storing the output voltage of the pixel, numeral 9 denotes a switching MOS transistor for performing connection and disconnection between the pixel output line 4 and the capacitor 8, numeral 10 denotes a MOS transistor switch for selecting the capacitor 8, numeral 11 denotes a shift register for outputting the control signal to the gate of the switch 10 to sequentially select the plurality of switches 10, numeral 12 denotes an output line for reading the charges from the selected capacitor 8, numeral 13 denotes an amplifier to which the line 12 is input, numeral 14 denotes an output terminal of the amplifier 13, numeral 15 denotes a comparator for judging the magnitude of the output value from the line 7, numeral 16 denotes a driving control circuit for driving the photoelectric conversion block and also controlling the signal from the comparator 15, and numeral 17 denotes a driving line for, e.g., a clock signal, an inverted clock signal and a start signal to drive the shift register 11. Numerals 18, 19 and 20 denote driving lines respectively for applying gate driving pulses to the gates of MOS transistors 3, 5 and 9, numeral 21 denotes a wiring for supplying a comparison potential to the comparator 15, and numeral 22 denotes a latch circuit for latching the output of the comparator 15.

In the example shown in FIG. 1, the pixel 1, the capacitor 8 and the latch circuit 22 are simultaneously reset. After then, the switch 9 is set to be conductive as maintaining the level of the line 20 high. As the signal charges are accumulated in the pixel 1, the potentials of the line 4 and the capacitor 8 increase. Then, if the output corresponding to the maximum value of the pixel output exceeds the reference potential determined by the wiring 21, the output of the comparator 15 is inverted to switch over the latch circuit 22. Thus, since the level of the line 20 is changed to be low and also the switch 9 is turned off, the signals accumulated up to this time are held by the capacitor 8.

In the image sensor having the plurality of photoelectric conversion blocks as shown in FIG. 1, even in a case where light intensity in each block is different from others, the output values of the blocks can be at about the same level by controlling the pixel signal accumulation time of each block to be different. Although the pixel of bipolar type is shown by way of example in FIG. 1, generally a photoelectric conversion pixel of any type may be used. Furthermore, monitoring of the pixel output is not limited to the maximum value detection. Namely, the detector of minimum value or the detector difference between the maximum and minimum values may be designed.

In the conventional art, any problem does not occur in a case where the number of photoelectric conversion blocks is small and each block is formed at the position separated from others. However, in a case where the number of blocks is large and thus it is necessary to array the photoelectric conversion blocks closely, there is the problem that it is impossible to allocate the space on which the driving control circuit 16 and the shift register 11 are arranged.

SUMMARY OF THE INVENTION

An object of the present invention is to downsize an image sensor.

In order to achieve the above object, according to one aspect of the present invention, there is provided an image sensor comprising: a plurality of photoelectric conversion elements; and a memory for storing control information to control signals sent from the plurality of photoelectric conversion elements, wherein the plurality of photoelectric conversion elements and the memory are formed in an identical semiconductor chip.

Other objects and features of the present invention will become apparent from the following detailed description and the attached drawings.

BRIEF DESCRIPTION OF THE DRAWINGS

FIG. 4 is a diagram for explaining an image sensor according to the third embodiment.

DETAILED DESCRIPTION OF PREFERRED EMBODIMENTS

Figure 1:
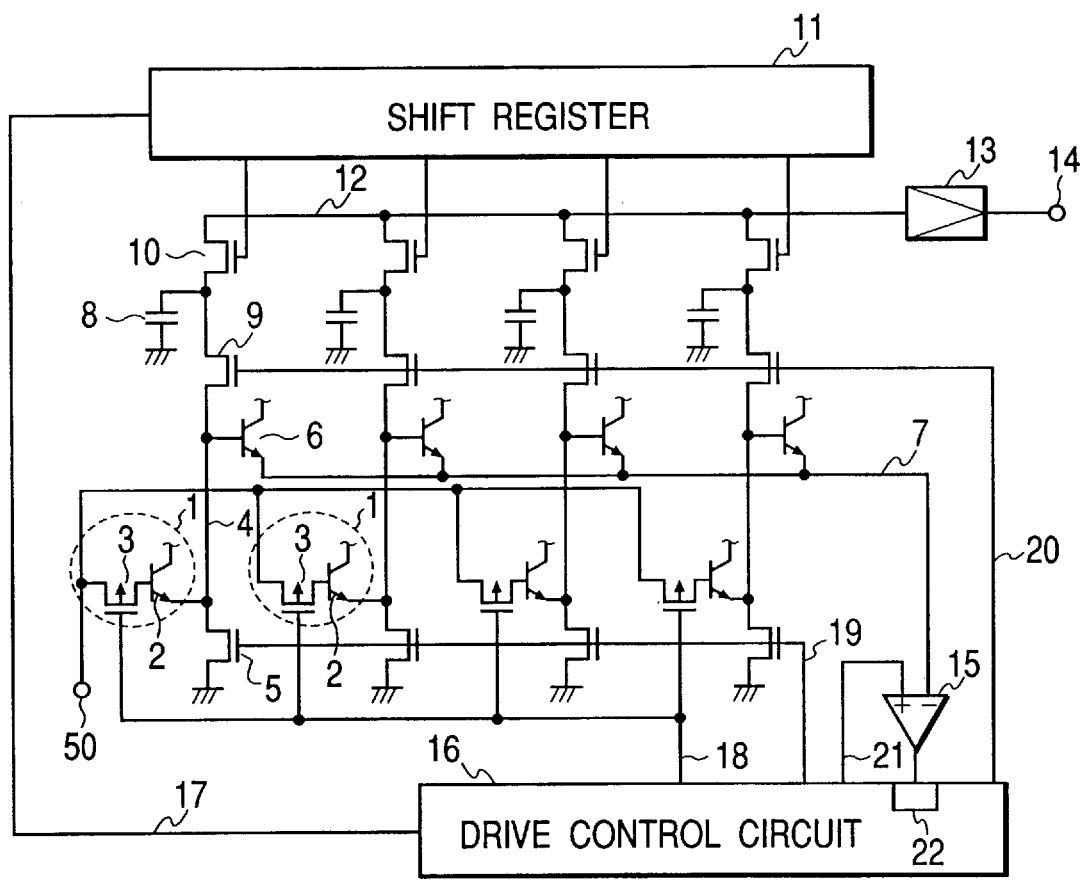
FIG. 1 is a diagram for explaining a conventional image sensor.

The first embodiment of the present invention will be explained in detail with reference to FIG. 2. In the drawing, numeral 1 denotes a photoelectric conversion pixel which is, like FIG. 1, composed of a reset MOS transistor and a bipolar transistor having a PN junction section of a photoelectric conversion element as its base. A pixel of other type such as MOS transistor amplification type pixel may be used. And, it is necessary that the pixel can read out a signal non-destructively in the first embodiment.

Numeral 24 denotes a photoelectric conversion section in which four blocks 24-1, 24-2, 24-3 and 24-4 are formed. Numeral 25 denotes a drive line of the photoelectric conversion element, and numeral 26 denotes an analog memory cell corresponding to each photoelectric conversion pixel. In the drawing, the analog memory cell 26 is composed of a capacitor 8 acting as a memory and a switch 51, and is driven by a drive line 27 which is used to perform reading and writing of the memory by turning on/off the gate of the switch 51. The analog memory cells 26 the number of which is the same as that of the photoelectric conversion pixels 1 together form an analog memory section 26'.

Numerals 28-1, 28-2 and 28-3 denote decoders through which the blocks are selected by address lines 32. Numeral 29 denotes a buffer circuit for selecting the driving line 25 in response to the output of the decoder 28-1, numeral 30 denotes a buffer circuit for selecting the driving line 27 in response to the output of the decoder 28-2, and numeral 31 denotes a digital memory in which the control information for controlling the signal from the photoelectric conversion element has been written. The memory 31 is provided together with the photoelectric conversion section within one semiconductor chip, and is accessed in response to the output of the decoder 28-3. Numeral 33 denotes a wiring output from a driving control circuit 16 for driving the photoelectric conversion pixel blocks, numeral 34 denotes a driving line also output from the circuit 16 for driving the analog memory blocks, numeral 35 denotes a wiring for writing information into the digital memory 31, and numeral 36 denotes a wiring for reading the information stored in the memory 31. In FIG. 2, it should be noted that the repetitive explanations of the parts respectively added with the same numerals as shown in FIG. 1 are omitted.

Subsequently, the operation according to the present embodiment will be explained. In the present embodiment, initially the photoelectric conversion section including the pixel 1, the analog memory section including the capacitor 8, and the digital memory section are all reset, and then the driving starts. To reset the photoelectric conversion section, the potential of the driving line 25 is set negative and a reset MOS transistor 3 is activated. After then, the potential of the line 25 is set positive and the transistor 1 is activated, and simultaneously a MOS transistor 5 is turned on. At this time, the base current flows to reset the base of the transistor 1, and the line 25 is then returned to be ground level (GND), whereby the base-emitter junction at the transistor 1 becomes reversely biased. Furthermore, to reset the analog memory section, the switches 51 and 9 are turned on, whereby the potential at this section 8 is lowered to the ground potential through the MOS transistor 5. Furthermore, to reset the digital memory section, "1" or "0" is written at all memory bits.

Subsequently, the address lines output from the driving control circuit 16 are changed over to repeatedly perform the reading of the photoelectric conversion blocks 24-1, 24-2, 24-3 and 24-4 in due order. In this operation, when each block is selected, the information of the digital memory 31 is also accessed.

After a certain time elapses, if a comparator 51 is inverted by the output of, e.g., the block 24-2, i.e., if any one of the photoelectric conversion pixel output within the block 24-2 exceeds a threshold value obtained from a wiring 21, a pulse for writing into the block corresponding to the block 24-2 is applied to the wiring 34. Then, a pulse for turning on the transistor 51 in the corresponding line is output from the buffer circuit 30, whereby the signal of the block 24-2 is stored in the analog memory section 26'. Simultaneously, the information representing the signal transfer, the signal accumulation time of this block and the like is written at the address corresponding to the block 24-2 in the memory 31. Here, it should be noted that the signal accumulation time represents the period of time from the accumulation start until the maximum photoelectric conversion signal in the block exceeds the threshold value. When the block 24-2 is again driven in the serial operation and inverts the comparator 15, the driving control circuit 16 does not generate the writing pulse to the analog memory section, and does not rewrite the digital memory 31, since the information representing that the signal transfer of the block 24-2 was finished has been written in the digital memory 31. For this reason, the information obtained at the time when the monitor output of the photoelectric conversion block first reaches the predetermined level is held in the analog memory section and the digital memory 31. This operation is repeated until the signal transfers of all the blocks terminate.

When the driving of the photoelectric conversion section finally terminates, the driving control circuit 16 controls the driving lines 20 and 17 to turn off the switch 9. Also, the circuit 16 reads the output from the analog memory section by scanning the decoder 28-2 and causing the shift register 11. The signal accumulation time information recorded in the digital memory 31 is used in a signal process such as auto-focusing or the like.

As can be understood from the above explanation, in the digital memory 31, the driving information, the accumulation time information for each block, and the information representing whether or not the signal transfer was performed are recorded or stored as the control information for the signals sent from the photoelectric conversion elements. As the digital memory in the present embodiment, a random access memory (RAM) is used.

Furthermore, by providing the digital memory 31 capable of writing and reading the control information for each block in the photoelectric conversion section and the analog memory section, it becomes possible to independently drive and control the plurality of closely arranged photoelectric conversion blocks 24-1, 24-2, 24-3 and 24-4, with the common driving control circuit, the common monitor circuit (i.e., maximum value detection circuit in the present embodiment), the common shift register and the like.

Subsequently, the second embodiment of the present invention will be explained in detail with reference to FIG. 3.

Figure 2:
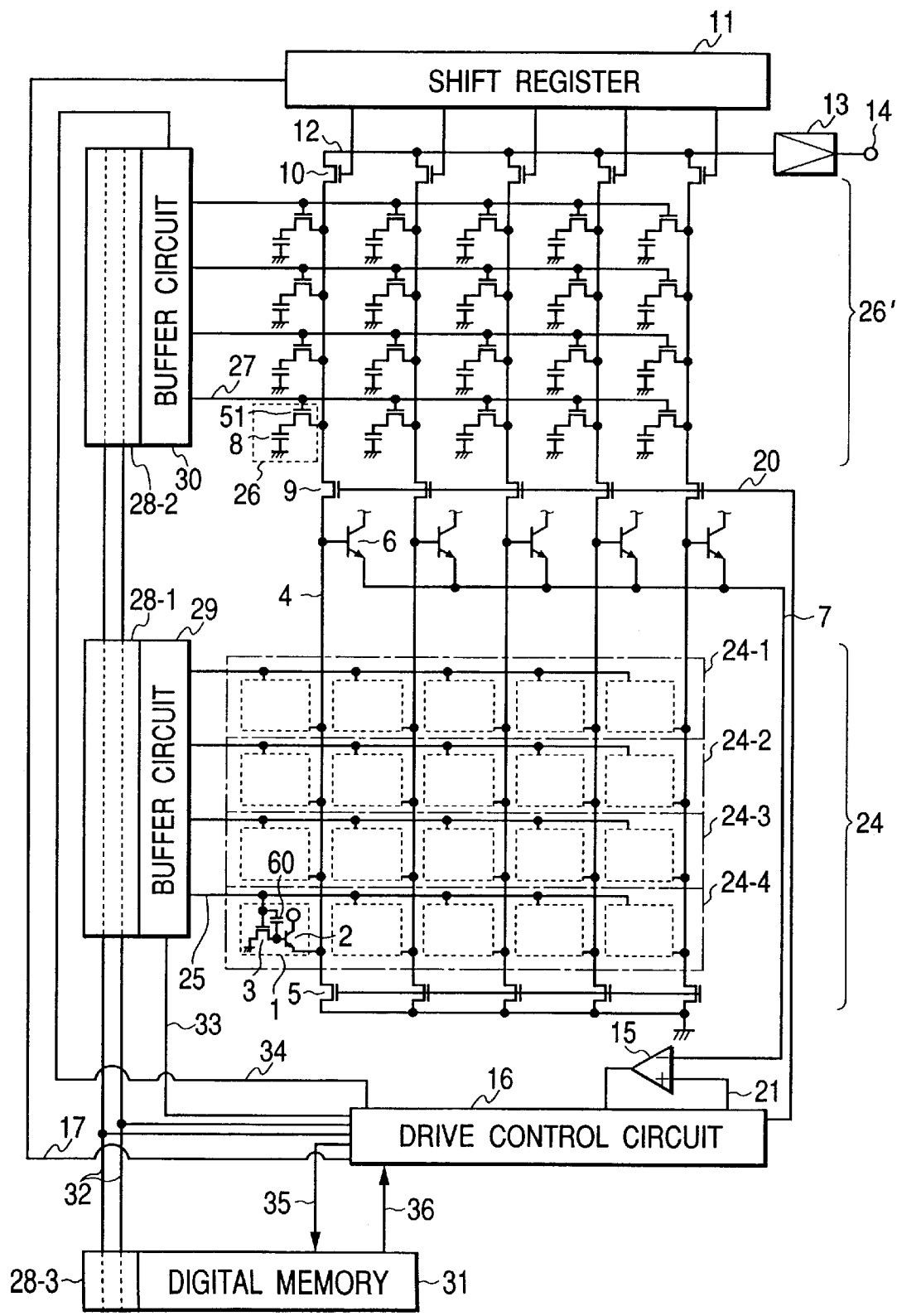
FIG. 2 is a diagram for explaining an image sensor according to the first embodiment.
Figure 3:
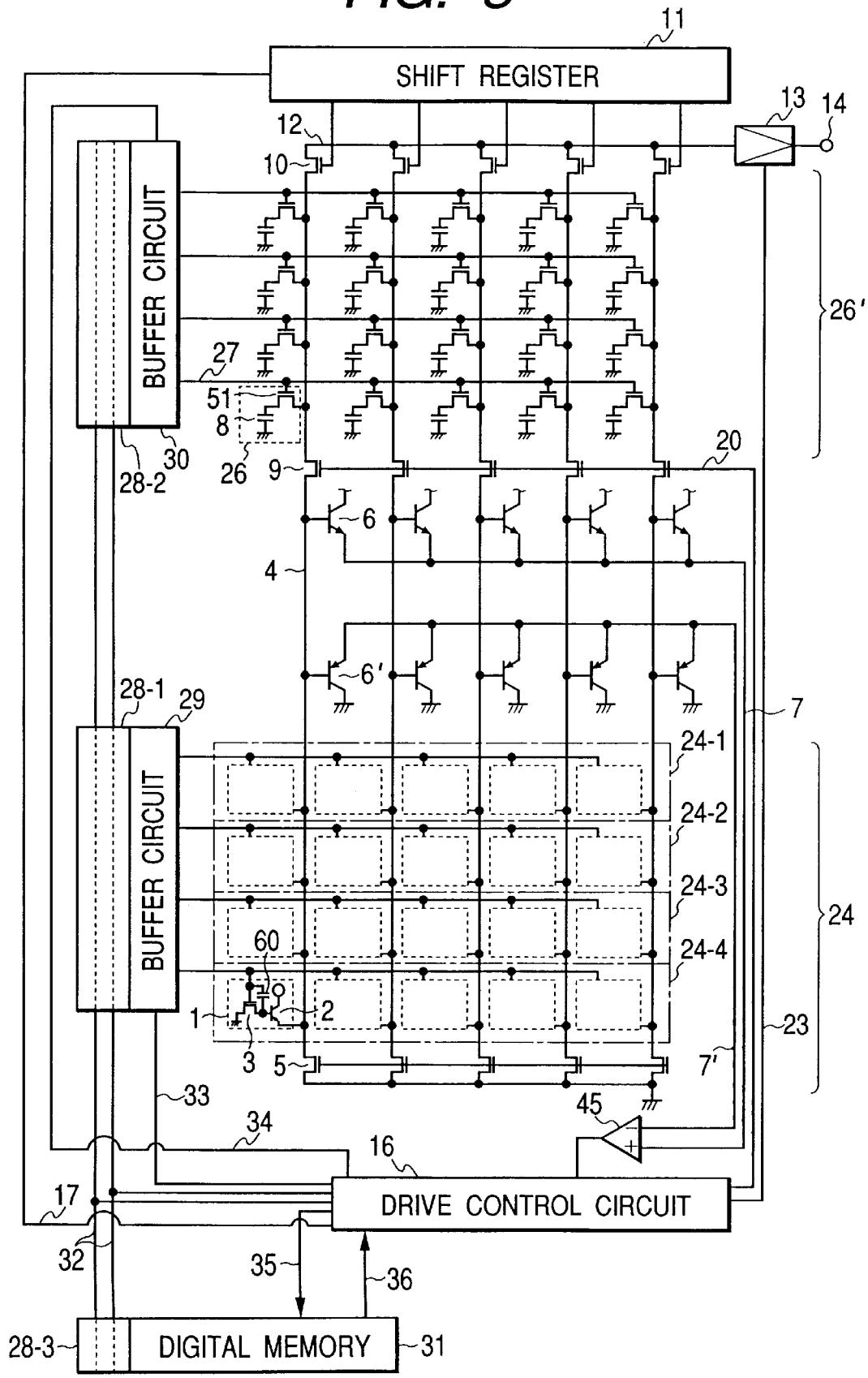
FIG. 3 is a diagram for explaining an image sensor according to the second embodiment.

In FIG. 3, the difference from the first embodiment shown in FIG. 2 is as follows. That is, FIG. 2 shows that only the maximum value detection circuit for outputting the maximum photoelectric conversion charge in the block is provided, while FIG. 3 shows that a minimum value detection circuit composed of parts 6' and 7' for outputting the minimum photoelectric conversion charge in the block is provided in addition to the maximum value detection circuit. Furthermore, in FIG. 3, the outputs from the maximum value detection circuit and the minimum value detection circuit are input to a different amplifier 45, and the gain of an amplifier 13 is controlled by a driving control circuit 16. Other points of the second embodiment are the same as those of the first embodiment shown in FIG. 2, whereby the explanations thereof are omitted.

Hereinafter, the operation according to the present embodiment will be explained.

In the present embodiment, the operation to be performed until "1" or "0" is written at all the bits in the digital memory is the same as that in the first embodiment.

Subsequently, the address lines output from the driving control circuit 16 are changed over to perform the reading of photoelectric conversion blocks 24-1, 24-2, 24-3 and 24-4 in due order. In the present embodiment, the signal accumulation time has been previously determined such that the respective blocks are read in the identical accumulation time.

That is, after the predetermined accumulation time elapses, the driving control circuit 16 sends a pulse to a driving line 20 to turn on a transistor 9. Furthermore, the circuit 16 controls buffer circuits 29 and 30 and decoders 28-1, 28-2 and 28-3, whereby the photoelectric conversion charges in the photoelectric conversion section are sequentially signal-transferred to the analog memory section in the unit of block. Here, in the case where the signal transfer to the analog memory section is performed in the unit of block, the maximum photoelectric conversion charge in the block is output from the maximum value detection circuit to an output line 7, while the minimum photoelectric conversion charge in the block is output from the minimum value detection circuit to the output line 7'. Thus, the differential value between the maximum and minimum photoelectric conversion charges in each block is output from the differential amplifier 45.

Then, in the driving control circuit, the obtained differential value is converted into the information concerning the gain of the amplifier at the time when the analog memory section finally outputs the signal, and the obtained information is recorded or stored in the digital memory section. The gain of the amplifier is set larger when the differential value is smaller, while smaller when the differential value is larger. For example, in case four different gains of the amplifier are set, each of the gains can be designated by digital information of two bits. As can be understood from the above explanation, the driving information and the information concerning the gain of the amplifier for each block are recorded in the digital memory unit. As the digital memory in the present embodiment, a random access memory (RAM) is used.

Furthermore, by providing a digital memory 31 capable of inputting and outputting the control information for each block in the photoelectric conversion section and the analog memory section, it is possible to independently drive and control the plurality of closely arranged photoelectric conversion blocks 24-1, 24-2, 24-3 and 24-4, by using the common driving control circuit, the common monitor circuit (i.e., maximum value detection circuit and minimum value detection circuit in the present embodiment), the common shift register, the common amplifier and the like.

FIG. 4 shows the third embodiment of the present invention. FIG. 4 shows the block arrangement in which each of the first and third lines in the photoelectric conversion element array is divided into the two photoelectric conversion blocks, i.e., blocks 24-1-1 and 24-1-2 in the first line and blocks 24-3-1 and 24-3-2 in the third line. Further, FIG. 4 shows an address line 39 for discriminating the divided block in the line, while the address line 32 for designating the line is the same as that shown in FIGS. 2 and 3.

In FIG. 4, numeral 40 denotes a switching MOS transistor for connecting a maximum value detection circuit 6 and an output line 7 to each other. The transistor 40 is turned on/off by output lines 41 from a driving control circuit 16. Two driving lines 42 and 43 are provided to each of the first and third lines in the analog memory section so that the analog memory section has the block arrangement corresponding to that of the photoelectric conversion section. In the photoelectric conversion section, a driving line 25 is provided to each line in the same manner. By using the line 25, a pixel 1 is driven from a decoder 28-1 through a buffer circuit 29. On the other hand, the analog memory section having a storage capacity 8 is so constructed that the storage capacity is controllable from a decoder 28-2 through a buffer circuit 30 by selectively using the driving line 42 or 43 according to the corresponding line-divided photoelectric conversion block.

Furthermore, in a digital memory 31, numeral 37 denotes a read-only memory (ROM) recording whether the line selected by address lines 32 is composed of one block or two blocks. An output 38 from the ROM 37 is determined to be low when the selected line is composed of one block, while high when the selected line is composed of two blocks. Therefore, in a case where the driving control circuit 16 indicates a line by the address lines 32, it is possible to easily know from the output 38 whether or not the block in the line is divided.

Furthermore, when the output 38 is high, the two blocks in the selected line are selected by the address lines 39. Furthermore, the two control lines 41 are simultaneously turned on when the output 38 is low, while the ON pulse is output alternately from the two control lines 41 to independently select each of the two blocks when the output 38 is high. Therefore, the driving control circuit 16 can easily detect the maximum value of the photoelectric conversion charge from the maximum value detection circuit 6 for every two blocks in the line. Then, the detected level is output by the circuit 16 to the output line 7, and compared with a threshold value by a comparator 15, whereby it is possible to store the signal accumulation time in the digital memory 31. Also, it is possible to read the image signal from the analog memory section to an output line 12, and then output through an amplifier 13.

Furthermore, the address lines 39 are input also to the buffer circuit 30 for the analog memory section. Thus, if there are two blocks in one line, it becomes possible to independently control each block.

In FIG. 4, the parts respectively added with the same numerals as those in FIG. 2 have the same functions as those of the corresponding parts respectively, whereby the repetitive explanations of these parts are omitted. In any case, even in such the arrangement as the plurality of blocks are provided in one line, if the ROM capable of distinguishing the block arrangement pattern of each line is added to the digital memory 31, it is possible to independently drive and control each of the plurality of photoelectric conversion blocks by using the common monitor circuit, the common driving control circuit and the like.

As can be understood from the above explanation, as the control information for the signal sent from the photoelectric conversion element, the driving information the accumulation time information for each block, and the information representing whether or not the signal has been transferred are stored in the digital memory 31 of the memory section. Furthermore, the information for distinguishing the block arrangement pattern in each line is stored in the ROM 37. As the digital memory in the present embodiment, a random access memory (RAM) is used.

Furthermore, the above-described second embodiment may be applied to the third embodiment.

As explained above, according to the first to third embodiments, even for the blocks of the photoelectric conversion section which are requested to be closely arranged, it becomes possible to independently drive and control each block.

Furthermore, even if it is necessary to closely arrange the photoelectric conversion elements in each block because the number of the blocks is large, the problem that it is impossible to allocate the space on which the driving control circuit and the shift register are arranged does not occur. Therefore, it is possible to easily cope with the large number of photoelectric conversion blocks.

Here, in the first to third embodiments, the monitor circuit is not limited to that described above. That is, the circuit capable of obtaining the characteristic information of the respective blocks may be used. For example, an addition circuit for obtaining addition signals of the respective photoelectric conversion blocks may be used as the monitor circuit.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image sensor formed in a single semiconductor substrate, comprising:

a plurality of photoelectric conversion elements;

a scanning circuit which reads out image signals sequentially from said plurality of photoelectric conversion elements;

a memory;

a drive circuit which drives said scanning circuit and outputs information of a driving result of said scanning circuit;

a first wiring which interconnects said memory and said drive circuit so that said memory stores the information output from said drive circuit; and a second wiring which interconnects said memory and said drive circuit to transfer the information so that said drive circuit drives said scanning circuit on the basis of the information which said memory receives from said drive circuit.

2. An image sensor according to claim 1, further comprising a feature information control circuit which effects control so as to store feature information in said memory based on signals outputted from said plurality of photoelectric conversion elements.

3. An image sensor according to claim 2, further comprising a signal processing circuit which processes said signals from said plurality of photoelectric conversion elements, wherein said signal processing circuit is controlled on the basis of the feature information stored in said memory.

4. An image sensor according to claim 3, wherein said signal processing circuit includes an amplifier which amplifies said signals from said plurality of photoelectric conversion elements, and wherein the feature information includes information for determining an amplification factor of said amplifier.

5. An image sensor according to claim 2, wherein the feature information includes an accumulation time during which said plurality of photoelectric conversion elements accumulate said signals.

6. An image sensor according to claim 1, wherein said memory includes a random-access memory (RAM).

7. An image sensor according to claim 1, wherein said memory includes a read-only memory (ROM).

* * * * *